US012416762B2

(12) United States Patent
Guo

(10) Patent No.: US 12,416,762 B2
(45) Date of Patent: Sep. 16, 2025

(54) TUNABLE OPTICAL FILTER DEVICE

(71) Applicant: SHENZHEN HYPERNANO OPTICS TECHNOLOGY CO., LTD, Shenzhen (CN)

(72) Inventor: Bin Guo, Shenzhen (CN)

(73) Assignee: SHENZHEN HYPERNANO OPTICS TECHNOLOGY CO., LTD., Shenzhen (CN)

( * ) Notice: Subject to any disclaimer, the term of this patent is extended or adjusted under 35 U.S.C. 154(b) by 769 days.

(21) Appl. No.: 17/779,670

(22) PCT Filed: Sep. 25, 2019

(86) PCT No.: PCT/CN2019/107818
§ 371 (c)(1),
(2) Date: May 25, 2022

(87) PCT Pub. No.: WO2021/056257
PCT Pub. Date: Apr. 1, 2021

(65) Prior Publication Data
US 2023/0341629 A1 Oct. 26, 2023

(51) Int. Cl.
G02B 6/293 (2006.01)
G02B 26/00 (2006.01)

(52) U.S. Cl.
CPC ....... G02B 6/29359 (2013.01); G02B 26/001 (2013.01)

(58) Field of Classification Search
CPC ...... G02B 6/29359; G02B 6/001; G02F 1/213
See application file for complete search history.

(56) References Cited

U.S. PATENT DOCUMENTS

| 5,111,329 A | 5/1992 | Gajewski et al. |
| 2015/0212313 A1* | 7/2015 | Hirokubo ............... G02B 26/02 359/578 |
| 2018/0017824 A1* | 1/2018 | Song ...................... H01S 5/141 |

FOREIGN PATENT DOCUMENTS

| CN | 103733035 A | 11/2010 |
| CN | 102375229 A | 3/2012 |
| CN | 104330890 A | 2/2015 |

(Continued)

OTHER PUBLICATIONS

English Translation of International Search Report from PCT/CN2019/107818 dated Jun. 28, 2020 (3 pages).

*Primary Examiner* — Angela M. Medich
(74) *Attorney, Agent, or Firm* — Calfee, Halter & Griswold LLP

(57) ABSTRACT

Disclosed is an adjustable optical filter device. The device comprises a first glass thin film provided with a first mirror and a second glass thin film provided with a second mirror. The peripheries of the surfaces of the first glass thin film and the second glass thin film that have a mirror are bonded to each other by means of a bond to form a cavity between the mirrors. The first glass thin film or the second glass thin film is provided with a driving unit for controlling the relative displacement of the first glass thin film and/or the second glass thin film. The tunable optical filter device has better optical filtering performance than existing filter devices, has the performance of small size and lower driving voltage, and can be applied to devices having a limited size, such as miniature spectrometers, small or even mini hyperspectral cameras or mobile phones.

16 Claims, 2 Drawing Sheets

(56) References Cited

FOREIGN PATENT DOCUMENTS

| CN | 105242395 | A  | 1/2016  |
|----|-----------|----|---------|
| CN | 105425384 | A  | 3/2016  |
| CN | 106133563 | A  | 11/2016 |
| EP | 0903615   | A2 | 3/1999  |
| WO | 2005064394| A1 | 7/2005  |

* cited by examiner

TUNABLE OPTICAL FILTER DEVICE

CROSS REFERENCE TO RELATED APPLICATIONS

This application claims the priority of the patent application PCT/CN2019/107818, filed on Sep. 25, 2019. The contents of this patent application are all hereby incorporated by reference.

TECHNICAL FIELD

The invention relates to the field of semiconductor devices, and in particular to a tunable optical filter device.

BACKGROUND TECHNIQUE

Substrate of Fabry-Perot interferometer (FPI) devices in the near-infrared and visible-range is usually an optical glass (such as synthetic quartz) substrate, and processed through optical and semiconductor processes to form mirror chips, two of which are then assembled into FPI module by external piezo actuators. The FPI module assembled in this way has a relatively large volume and a high driving voltage, and does not fit in with devices with extremely limited space sizes, such as handheld hyperspectral cameras.

On the other hand, existing FPI devices processed by micromachining are mostly bulk-processed or surface-processed. In surface-processed devices, suspending floating thin films create movable mirrors, while in bulk-processed devices, substrates with a cantilever beam structure create movable mirrors.

Substrate of FPI devices in the near-infrared and visible-range is usually an optical glass (such as synthetic quartz glass) substrate, which makes it difficult to process the substrate. Usually, glass can only be etched with chemical solutions (such as hydrofluoric acid). In this way, the etching speed is very slow (less than 1 micron/min), and the size of the line that can be processed is limited by the thickness of the substrate (generally 200-700 microns), which makes it impossible to be finely processed. Processing the cantilever beam on the substrate will increase the complexity of device design and processing, thereby increasing the cost. The spring and the mirror of a bulk-processed device are provided by the same substrate, which results in the inherent stress and deformation of the mirror affected by the spring. Since the cantilever beam structure occupies a large chip area, it also limits the size of the mirror itself.

SUMMARY OF THE INVENTION

In order to solve the problems existing in the prior art, the present invention proposes a tunable optical filter device to try to solve the problems of the existing tunable filter device of large volume, high driving voltage and difficult substrate processes.

The present invention provides a tunable optical filter device which comprises a first glass film having a first mirror and a second glass film having a second mirror, and the surfaces of the first glass film and the second glass film on which the mirrors are located are bonded to each other at the periphery through a bonding compound to form a cavity between the mirrors, and the first glass film or the second glass film are provided with a driving unit for directly driving deformation of the first glass film and/or the second glass film and thereby creating a movement thereof. The relative displacement of the first glass film and/or the second glass film is controlled by the driving unit, and thereby adjusting the interval between the cavities to realize the tunable optical filtering function. The manufacturing process of the tunable optical filter is simple and the cost is low. It can be applied to optical device of limited space, such as handheld hyperspectral cameras or mobile phones.

In a preferred embodiment, the surface of the first glass film opposite to the mirror is provided in the middle with an annular weight formed by silicon. By virtue of the deposition of the annular weight, the flatness of the first glass film during operation is improved.

In a preferred embodiment, the surface of the second glass film opposite to the mirror is provided at the periphery with a support member formed by silicon. The support member is usually a substrate used in the manufacturing process of the glass film, and the support member formed by the substrate can support the second glass film in the following process.

In a preferred embodiment, the first mirror and the second mirror are parallel to each other and define a reflection area in the cavity, and the support member covers an area outside of the reflection area. The support member blocks the light from corresponding aperture and improve the filtering performance of the filter device.

In a preferred embodiment, the first glass film thickness has a thickness of between 10-200 microns. First glass film of thickness in the range on the one hand facilitates micromachining, and on the other hand perform better as a movable part.

In a preferred embodiment, the second glass film has a thickness of more than 200 microns. Second glass film of thickness in the range as a fixed part improves the stability of the Fabry-Perot cavity.

In a preferred embodiment, the first glass film and the second glass film have the same thickness of between 10-200 microns, so that the first glass film and the second glass film can be used as movable parts at the same time to adjust the gap between the first glass film and the second glass film.

In a preferred embodiment, the way of bonding comprises eutectic bonding, polymer or anodic bonding. By means of bonding, the two glass film structures can be tightly combined to ensure the stability of the tunable optical filter.

In a preferred embodiment, the material of the first mirror and the second mirror includes silicon, silicon oxide or a combination thereof, and silver. Material of mirror can be selected diversely depending on actual needs.

In a preferred embodiment, driving mode of the driving unit comprises capacitive driving or actuator driving by piezoelectric film structure. The relative displacement of the first glass film and/or the second glass film is controlled by capacitive driving or actuator driving by piezoelectric film structure, thereby achieving the effect of tunable optical filtering.

In a preferred embodiment, the surface of the first glass film opposite to the mirror is provided with a peripheral silicon layer, the driving unit comprises a first electrode disposed on the surface of the peripheral silicon layer and a second electrode disposed on the first mirror opposite to the first electrode. By virtue of the capacitor structure formed between the first electrode and the second electrode on the surface of the peripheral silicon layer, the displacement of the first glass film can be driven to adjust the gap of the cavity.

In a preferred embodiment, the second glass film has a lateral extension beyond the first glass film, and the driving unit comprises a first electrode disposed between the first glass film and the bonding compound and a second electrode disposed between the lateral extension and the bonding compound and opposite to the first electrode. By virtue of the capacitor structure formed between the first electrode and the second electrode on the second glass film, the relative displacement of the first glass film and/or the second glass film can be driven.

In a preferred embodiment, the driving unit comprises a piezoelectric film structure disposed on the periphery of the surface of the first glass film opposite to the mirror. The first glass film is deformed and moved relying on the piezoelectric film structure disposed on it.

In a preferred embodiment, the ways of disposing the piezoelectric film structure on the first glass film comprise sputtering or sol-gel.

In a preferred embodiment, the piezoelectric film structure includes a lead zirconate titanate film, an aluminum nitride film or a zinc oxide film. Material of piezoelectric film structure can be selected diversely depending on actual needs.

In the tunable optical filter device presented in the invention, glass films are used as movable film structures. The glass films bonded and milled to a specific thickness with silicon, optical mirror is deposited on the glass film by micromachining, and the surface of glass films having the mirrors are bonded to form a FPI structure. The movable film structure can be moved by the driving unit set on the glass film structure, thereby adjusting the gap of the Fabry-Perot cavity. The combination of glass film and silicon structure, the flexibility of the optical filter device structure can be improved. The design of the annual weight can be adjusted to make it suitable for various devices of different sizes. Compared with existing filters, the tunable optical filter device presented has better optical filtering performance, smaller size, lower driving voltage, simple processing technology, low cost, and can be applied to mobile phones, miniature spectrometers and other devices with extremely limited space.

DESCRIPTION OF THE DRAWINGS

The drawings are included to provide a further understanding of the embodiments and the drawings are incorporated into this specification and constitute a part of this specification. The drawings illustrate the embodiments and together with the description serve to explain the principles of the present invention. It is easily recognized that the other embodiments and the many expected advantages of the embodiments. They are better understood by including the following detailed description. The elements of the drawings are not necessarily in proportion to each other. The same reference numerals refer to corresponding similar components.

DESCRIPTION OF EMBODIMENTS

In the following detailed description, reference is made to the accompanying drawings, which form a part of the detailed description and are shown through illustrative specific embodiments in which the present invention can be practiced. In this regard, directional terms such as "top", "bottom", "left", "right", "upper", "lower", etc. are used with reference to the orientation of the described figure. Because the components of an embodiment can be positioned in several different orientations, directional terms are used for illustration purposes and directional terms are by no means limiting. It should be understood that other embodiments may be utilized or logical changes may be made without departing from the scope of the present invention. Therefore, the following detailed description should not be taken in a limiting sense, and the scope of the present invention is defined by the appended claims.

Figure 1:
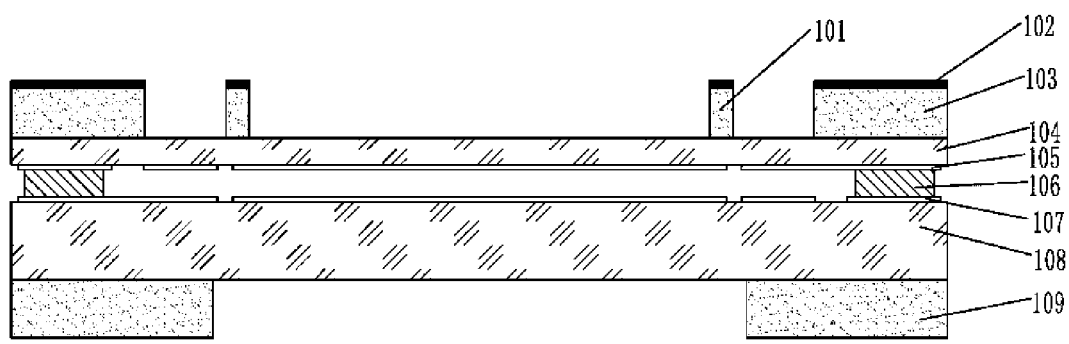
FIG. 1 is a cross-sectional view of a tunable optical filter device according to a first embodiment of the present invention.

FIG. 1 shows a cross-sectional view of a tunable optical filter device according to a first embodiment of the present invention. As shown in FIG. 1, the tunable optical filter device comprises a first glass film 104 and a second glass film 108, wherein the first glass film 104 is set as a movable substrate structure, and the second glass film 108 is set as a fixed substrate structure. The first glass film 104 and the surface silicon layer 103 are tightly combined by bonding, and are milled into a composite wafer of specific thickness. The second glass film 108 and the other surface silicon layer 109 are tightly combined by bonding, and milled into a composite wafer of required thickness as well. The optical mirror 105 and the optical mirror 107 are respectively deposited on the first glass film 104 and the second glass film 108, and etched into corresponding patterns by micro processing. The surfaces of the first glass film 104 and the second glass film 108 on which the mirrors are located are bonded to each other at the periphery through the bonding compound 106 to form a Fabry-Perot cavity. A first electrode 102 is provided on the outer surface of the surface silicon layer 103. The first electrode 102 and the optical mirror 105 form a driving capacitor for the movement of the first glass film 104, driven by the driving capacitor, the first glass film 104 is moved to adjust the gap of the Fabry-Perot cavity to realize the function of tunable optical filtering. The device presented requires low-cost and simple processing, and applies to devices with limited space such as mobile phones.

In a preferred embodiment, the thickness of the first glass film 104 is between 10-200 microns, and the thickness of the second glass film 108 is greater than 200 microns. The thickness range value is selected such to ensure the movability of the first glass film 104 and the stability of the second glass film 108, and the convenience of bonding and grinding processes.

In a preferred embodiment, when the first glass film 104 and the second glass film 108 are bonded, the optical mirror 105 and the optical mirror 107 are parallel to each other and define a reflection zone in the Fabry-Perot cavity. The material of the optical mirror 105 and optical mirror 107 can be metal, specifically, silver or other metals. The mirror structure of metal can form a driving capacitor for driving the movement of the first glass film 104 through the surface silicon layer 103 with good conductivity and the first electrode 102. Material of the mirror can be selected as the electrode depending on actual needs. It is also applicable to dope silicon film to achieve a certain degree of conductivity required as an electrode. The first electrode 102 is set on the outer surface of the surface silicon layer 103 for the following package connection of the device.

In a preferred embodiment, a plasma etching method is used to partially remove the surface silicon layer 103 on the first glass film 104 to form an annular weight 101 for enhancing the flatness of the first glass film 104. It should be recognized that the shape of the annular weight 101 is not limited to circle, other regular or irregular shapes such as an ellipse and a rectangle are also applicable. The etching method is not limited to plasma etching, etching with chemical reagents is also applicable, etching method can be chosen depending on the specific application scenario and etching shape required.

In a preferred embodiment, plasma etching is used to partially remove the surface silicon layer 109 on the second glass film 108 to form a support structure that covers the area outside of the reflection area of the optical mirror 107 on the second glass film 108 so that the aperture of corresponding light can be blocked.

In a specific embodiment, the first glass film 104 and the second glass film 108 can be bonded by eutectic bonding, polymer or anodic bonding. Eutectic bonding uses metal as the transition layer to achieve the bonding between silicon and silicon. Firm bonding can be achieved even without fine surface or high bonding temperature. Anodic bonding has the advantages of low bonding temperature, good compatibility with other process, high bonding strength and stability. It can be used for bonding between silicon/silicon substrates, non-silicon materials and silicon materials, and mutual bonding between glass, metals, semiconductors, and ceramics. Depending on the actual bonding surface process and material, a suitable bonding method can be selected to realize the bonding between the two glass films.

Figure 2:
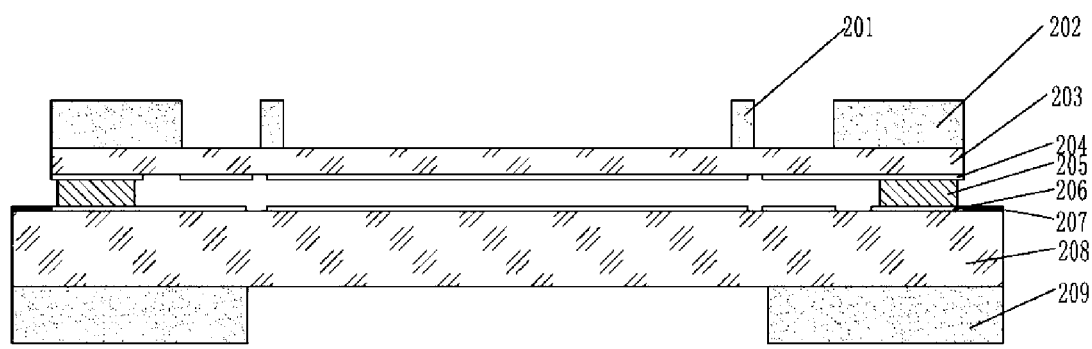
FIG. 2 is a cross-sectional view of a tunable optical filter device according to a second embodiment of the present invention.

FIG. 2 shows a cross-sectional view of a tunable optical filter device according to a second embodiment of the present invention. As shown in FIG. 2, the tunable optical filter device comprises a first glass film 203 and a second glass film 208, wherein the first glass film 203 is set as a movable substrate structure, and the second glass film 208 is set as a fixed substrate structure. The first glass film 203 and the surface silicon layer 202 are tightly combined by bonding, and milled into a composite wafer of specific thickness. The second glass film 208 and the other surface silicon layer 209 are tightly combined by bonding, and are also milled to form a composite wafer of required thickness. The optical mirror 204 and the optical mirror 206 are respectively deposited on the first glass film 203 and the second glass film 208 by micro-processing and etched into corresponding patterns. The first glass film 203 and the surface of the second glass film 208 on which the mirrors located are bonded to each other at the periphery through the bonding compound 205 to form a Fabry-Perot cavity. The second glass film 208 has a lateral extension beyond the first glass film 203. The first electrode 207 is set on a side of lateral extension of the second glass film 208 on which the optical mirror 206 exists. The first electrode 207 and the optical mirror 204 define a driving capacitor for driving the movement of the first glass film 203, by which the gap of the Fabry-Perot is adjusted to realizes tunable optical filtering. The device has simple structure and small size, simple processing process and low cost, and can be applied to devices with limited space such as mobile phones.

In a preferred embodiment, the thickness of the first glass film 203 is between 10-200 microns, and the thickness of the second glass film 208 is greater than 200 microns. The thickness range value is selected to ensure the movability of the first glass film 203 and the stability of the second glass film 208, and the convenience of bonding and grinding processes.

In a preferred embodiment, when the first glass film 203 and the second glass film 208 are bonded, the optical mirror 204 and the optical mirror 206 are parallel to each other and form a reflection zone in the Fabry-Perot cavity. The material of the optical mirror 204 and optical mirror 206 can be silicon, silicon oxide or a combination thereof, and silver. Combined with the first electrode 207, the mirror structure of metal can form a driving capacitor for driving the movement of the first glass film 207. It is also applicable to dope silicon film to achieve a certain degree of conductivity required as an electrode. Material of the mirror can be selected as the electrode depending on actual needs.

Figure 3:
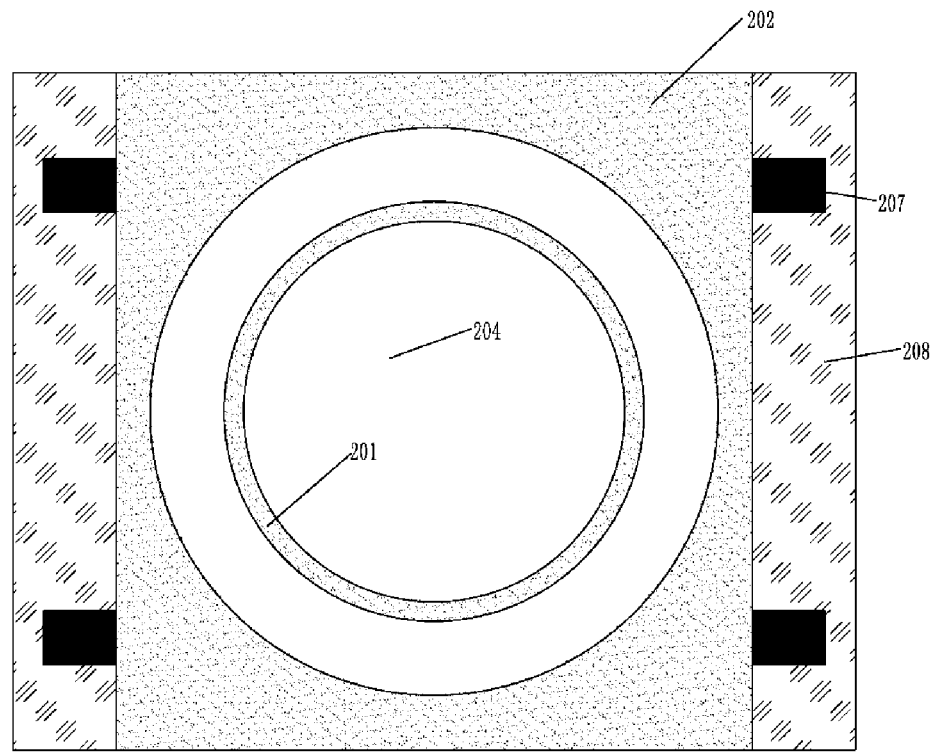
FIG. 3 is a top view of a tunable optical filter device according to a second embodiment of the present invention.

Turning now to FIG. 3. FIG. 3 shows a top view of the tunable optical filter device according to the second embodiment of the present invention. As shown in FIG. 3, for sake of the following packaging processing, the first electrode 207 is disposed on the extension surface of the second glass film 208 to ensure that the first electrode 207 is not blocked by the first glass film 203 after a Fabry-Perot cavity is formed by the second glass films 208 and the first glass film 203.

In a preferred embodiment, a plasma etching method is used to partially remove the surface silicon layer 202 on the first glass film 203 to form an annular weight 201 for improving the flatness of the first glass film 203. It should be recognized that the shape of the annular weight 201 is not limited to circle, other regular or irregular shapes such as an ellipse and a rectangle are also applicable. The etching method is not limited to plasma etching, etching with chemical reagents is also applicable, etching method can be chosen depending on the specific application scenario and etching shape required.

In a preferred embodiment, a part of the surface silicon layer 209 on the second glass film 208 is removed by plasma etching to create support structure, which covers the area outside of the reflection area of the optical mirror 206 on the second glass film 208 so that the aperture of corresponding light is blocked.

In a specific embodiment, the first glass film 203 and the second glass film 208 can be bonded by eutectic bonding, polymer or anodic bonding. Eutectic bonding uses metal as the transition layer to achieve the bonding between silicon and silicon. Firm bonding can be achieved even without fine surface or high bonding temperature. Anodic bonding has the advantages of low bonding temperature, good compatibility with other process, high bonding strength and stability. It can be used for bonding between silicon/silicon substrates, non-silicon materials and silicon materials, and mutual bonding between glass, metals, semiconductors, and ceramics. Depending on the actual bonding surface process and material, a suitable bonding method can be selected to realize the bonding between the two glass films.

Figure 4:
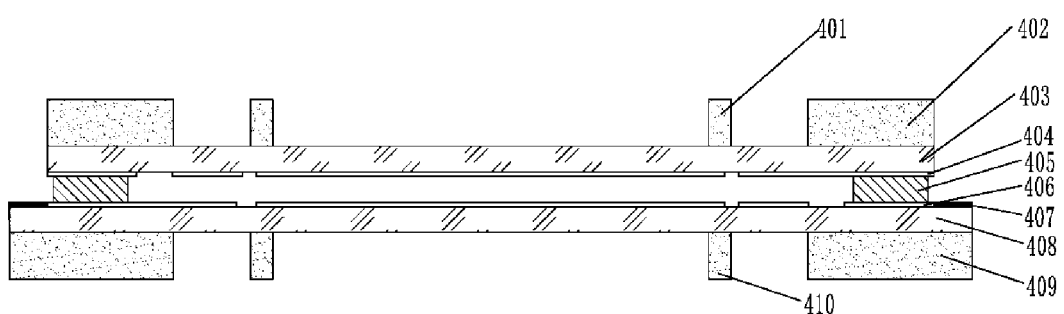
FIG. 4 is a cross-sectional view of a tunable optical filter device according to a third embodiment of the present invention.

Turning now to 4, as shown in FIG. 4, the tunable optical filter device comprises a first glass film 403 and a second glass film 408, wherein the first glass film 403 and the second glass film 408 are both configured as a movable substrate. The first glass film 403 and the surface silicon layer 402 are tightly combined by bonding, and are milled into a composite wafer of specific thickness. The second glass film 408 and the other surface silicon layer 409 are tightly combined by bonding, and milled into a composite wafer of required thickness as well. The optical mirror 404 and the optical mirror 406 are respectively deposited on the first glass film 403 and the second glass film 408, and etched into corresponding patterns by micro processing. The surfaces of the first glass film 403 and the second glass film 408 on which the mirrors are located are bonded to each other at the periphery through the bonding compound 405 to form a Fabry-Perot cavity. The second glass film 408 has a lateral extension beyond the first glass film 403. The first electrode 407 is set on a side of lateral extension of the second glass film 408 on which the optical mirror 406 exists. The first electrode 407 and the optical mirror 404 define a driving capacitor for driving the movement of the first glass film 403 and the second glass film 408, by which the gap of the Fabry-Perot is adjusted to realizes the function of tunable optical filtering. The device has simple structure and small size, simple processing process and low cost, and can be applied to devices with limited space such as mobile phones.

In a preferred embodiment, the first glass film 403 and the second glass film 408 have the same thickness of between 10-200 microns. The thickness range value is chosen to ensure the movability of the first glass film 403 and the second glass film 408 and the convenience of bonding and grinding processes.

In a preferred embodiment, when the first glass film 403 and the second glass film 408 are bonded, the optical mirror 404 and the optical mirror 406 are parallel to each other and define a reflection zone in the Fabry-Perot cavity. The material of optical mirror 404 and optical mirror 406 can be silicon, silicon oxide or a combination thereof and silver. The mirror structure of the metal material combining the first electrode 407 forms a driving capacitor for driving the movement of the first glass film 403. Material of the mirror can be selected as the electrode depending on actual needs. It is also applicable to dope silicon film to achieve a certain degree of conductivity required as an electrode.

In a preferred embodiment, for sake of the following packaging processing, the first electrode 407 is disposed on the extension surface of the second glass film 408 to ensure that the first electrode 407 is not blocked by the first glass film 403 after a Fabry-Perot cavity is formed by the second glass films 408 and the first glass film 403.

In a preferred embodiment, a plasma etching method is used to partially remove the surface silicon layer 402 on the first glass film 403 to form an annular weight 401 for improving the flatness of the first glass film 403, in the same way, a plasma etching method is used to partially remove the surface silicon layer 409 on the second glass film 408 to form an annular weight 410 for improving the flatness of the second glass film 408. It should be recognized that the shape of the annular weight 401 and 410 are not limited to circle, other regular or irregular shapes such as an ellipse and a rectangle are also applicable. The etching method is not limited to plasma etching, etching with chemical reagents is also applicable, etching method can be chosen depending on the specific application scenario and etching shape required.

In a specific embodiment, the first glass film 403 and the second glass film 408 can be bonded by eutectic bonding, polymer or anodic bonding. Eutectic bonding uses metal as the transition layer to achieve the bonding between silicon and silicon. Firm bonding can be achieved even without fine surface or high bonding temperature. Anodic bonding has the advantages of low bonding temperature, good compatibility with other process, high bonding strength and stability. It can be used for bonding between silicon/silicon substrates, non-silicon materials and silicon materials, and mutual bonding between glass, metals, semiconductors, and ceramics. Depending on the actual bonding surface process and material, a suitable bonding method can be selected to realize the bonding between the two glass films.

Figure 5:
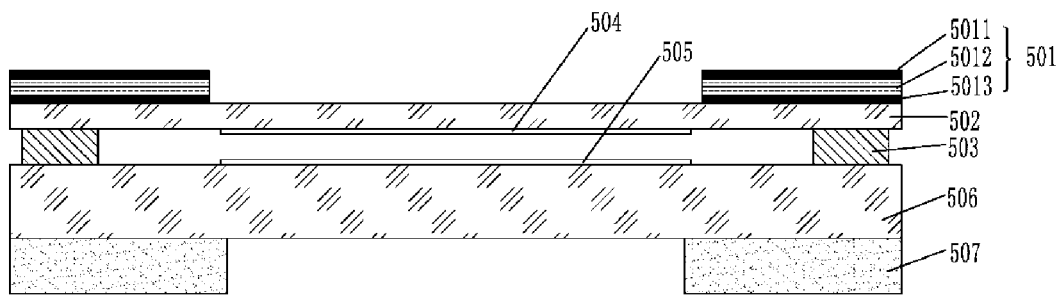
FIG. 5 is a cross-sectional view of a tunable optical filter device according to a fourth embodiment of the present invention.

Continuing to refer to FIG. 5, FIG. 5 shows a cross-sectional view of a tunable optical filter device according to a third embodiment of the present invention. As shown in FIG. 5, the tunable optical filter device comprises a first glass film 502 and a second glass film 506, wherein the first glass film 502 is configured as a movable substrate structure, and the second glass film 506 is configured as a fixed substrate structure. The second glass film 506 and the surface silicon layer 507 are tightly combined by bonding, and are milled into composite wafer of specific thickness. The optical mirror 504 and the optical mirror 505 are respectively deposited on the first glass film 502 and the second glass film 506, and etched into corresponding patterns by micro processing. The surfaces of the first glass film 502 and the second glass film 506 on which the mirrors are located are bonded to each other at the periphery through the bonding compound 503 to form a Fabry-Perot cavity. Piezoelectric film structures 501 is configured on both sides of the surface of the first glass film 502 opposite to the optical mirror 504, which is used to drive the movement of the first glass film 502 to adjust the gap of the Fabry-Perot cavity to realize tunable optical filtering. The device has simple structure, small size, simple processing process and low cost, and can be applied to devices with limited space such as mobile phones.

In a specific embodiment, the piezoelectric film structure 501 comprises a piezoelectric film 5012, electrodes 5011 and 5013 disposed on both surfaces of the piezoelectric film 5012. The electrodes 5011 and 5013 are made of metal such as platinum, etc. The material of the piezoelectric film includes lead zirconate titanate, aluminum nitride or zinc oxide. As a ferroelectric film, lead zirconate titanate film has higher piezoelectric, dielectric and heat release properties than non-ferroelectric films (such as aluminum nitride film or zinc oxide film). Depending on specific application scenarios, the piezoelectric film material can be chosen to meet the requirements of various parameters in the application.

In a preferred embodiment, the piezoelectric film structure 501 is deposited on the surface of the first glass film 502 by means of sputtering or sol-gel. It should be realized that methods other than sputtering or sol-gel may also be used to deposit piezoelectric film structure 501 on the surface of the first glass film 502, for example, bonding is also acceptable to realize the technical effects of the present invention. Specifically, the deposition process can be carried out according to the material of the piezoelectric film structure and the material of the substrate in actual application.

In a preferred embodiment, the thickness of the first glass film 502 is between 10-200 microns, and the thickness of the second glass film 506 is greater than 200 microns. The thickness range value is chosen such to ensure movability and the stability of the second glass film 506, and the convenience of bonding and grinding processes.

In a preferred embodiment, when the first glass film 502 and the second glass film 506 are bonded, the optical mirror 504 and the optical mirror 505 are parallel to each other and define a reflection zone in the Fabry-Perot cavity. The material of the optical mirror 504 and optical mirror 505 can be silicon, silicon oxide or a combination thereof and silver.

In a preferred embodiment, a part of the surface silicon layer 507 on the second glass film 506 is removed by plasma etching to create support structure, which covers the area outside of the reflection area of the optical mirror 505 on the second glass film 5006 so that the aperture of corresponding light is blocked.

In a specific embodiment, the first glass film 502 and the second glass film 506 can be bonded by eutectic bonding, polymer or anodic bonding. Eutectic bonding uses metal as the transition layer to achieve the bonding between silicon and silicon. Firm bonding can be achieved even without fine surface or high bonding temperature. Anodic bonding has the advantages of low bonding temperature, good compatibility with other process, high bonding strength and stability. It can be used for bonding between silicon/silicon substrates, non-silicon materials and silicon materials, and mutual bonding between glass, metals, semiconductors, and ceramics. Depending on the actual bonding surface process and material, a suitable bonding method can be selected to realize the bonding between the two glass films.

The tunable optical filter of the present invention uses a glass film as a substrate, deposes an optical mirror on one surface by micromachining, and bonds and mills silicon on the other surface to create a composite wafer structure of specific thickness. The mirror and silicon are etched into corresponding patterns or structures, and the two glass film mirrors are bonded to form a Fabry-Perot cavity. Electrodes or piezoelectric film structures configured on the glass film drive the movable glass film to adjust the gap of the Fabry-Perot cavity and realize tunable filtering of the tunable optical filter. A lower driving voltage is required to drive the movement of movable glass film. The size of presented filter device is small so that it is suitable for devices with extremely limited space.

Obviously, those skilled in the art can make various modifications and changes to the embodiments of the present invention without departing from the spirit and scope of the present invention. In this way, if these modifications and changes are within the scope of the claims of the present invention and their equivalents, the present invention is also intended to cover these modifications and changes. The word "comprising" does not exclude the presence of other elements or steps not listed in a claim. The simple fact that certain measures are recorded in mutually different dependent claims does not indicate that the combination of these measures cannot be used for profit. Any reference signs in the claims should not be considered as limiting the scope.

The invention claimed is:

1. A tunable optical filter device, wherein the device comprises a first glass film having a first mirror and a second glass film having a second mirror, and the surfaces of the first glass film and the second glass film on which the first mirror and the second mirror are located are bonded to each other at the periphery through a bonding compound to form a cavity between the first mirror and the second mirror, and the first glass film or the second glass film are provided with a driving unit for directly driving deformation of the first glass film and/or the second glass film and thereby creating a movement thereof, at least a part of the driving unit used to drive the deformation is arranged outside the cavity between the first mirror and the second mirror, and wherein a surface of the second glass film opposite to the second mirror is provided at the periphery with a support member formed by silicon.

2. The tunable optical filter device according to claim 1, wherein a surface of the first glass film opposite to the first mirror is provided in the middle with an annular weight formed by silicon.

3. The tunable optical filter device according to claim 1, wherein the first mirror and the second mirror are parallel to each other and define a reflection area in the cavity, and the support member covers an area outside of the reflection area.

4. The tunable optical filter device according to claim 1, wherein the first glass film has a thickness of between 10-200 microns.

5. The tunable optical filter device according to claim 1, wherein the second glass film has a thickness of more than 200 microns.

6. The tunable optical filter device according to claim 1, wherein the first glass film and the second glass film have a same thickness of between 10-200 microns.

7. The tunable optical filter device according to claim 6, wherein the surfaces of the first glass film and the second glass film opposite to the first mirror and the second mirror are respectively provided with annular weights in the middle and support members at the periphery.

8. The tunable optical filter device according to claim 6, wherein the second glass film has a lateral extension beyond the first glass film, and the driving unit comprises a first electrode disposed between the first glass film and the bonding compound and a second electrode disposed between the lateral extension and the bonding compound and opposite to the first electrode.

9. The tunable optical filter device according to claim 1, wherein the way of bonding comprises eutectic bonding, polymer bonding or anodic bonding.

10. The tunable optical filter device according to claim 1, wherein material of the first mirror and the second mirror comprises silicon, silicon oxide or a combination thereof, or silver.

11. The tunable optical filter device according to claim 1, wherein driving mode of the driving unit comprises capacitive driving or actuator driving by piezoelectric film structure.

12. The tunable optical filter device according to claim 1, wherein the surface of the first glass film opposite to the first mirror is provided with a surface silicon layer, and the driving unit comprises a first electrode disposed on the surface of the surface silicon layer and a second electrode disposed on the first mirror and opposite to the first electrode.

13. The tunable optical filter device according to claim 1, wherein the second glass film has a lateral extension beyond the first glass film, and the driving unit comprises a first electrode disposed between the first glass film and the bonding compound and a second electrode disposed between the lateral extension and the bonding compound and opposite to the first electrode.

14. The tunable optical filter device according to claim 1, wherein the driving unit comprises a piezoelectric film structure disposed on the periphery of the surface of the first glass film opposite to the first mirror.

15. The tunable optical filter device according to claim 14, wherein way of disposing the piezoelectric film structure on the first glass film comprise sputtering or sol-gel.

16. The tunable optical filter device according to claim 14, wherein the piezoelectric film structure comprises a lead zirconate titanate film, an aluminum nitride film or a zinc oxide film.

* * * * *